United States Patent [19]
Shinohara

[11] Patent Number: 5,880,735
[45] Date of Patent: Mar. 9, 1999

[54] METHOD FOR AND APPARATUS FOR TRANSPARENCY CONVERSION, IMAGE PROCESSING SYSTEM

[75] Inventor: Mikio Shinohara, Tokyo, Japan

[73] Assignee: Sega Enterprises, Ltd., Tokyo, Japan

[21] Appl. No.: 810,403

[22] Filed: Mar. 4, 1997

[30] Foreign Application Priority Data

Mar. 6, 1996 [JP] Japan .................................. 8-048818

[51] Int. Cl.$^6$ ...................................................... G09G 1/16
[52] U.S. Cl. .......................................... 345/419; 345/422
[58] Field of Search .................... 345/419, 420, 345/421, 422, 423

[56] References Cited

U.S. PATENT DOCUMENTS 4,727,465  2/1988  Bunker et al. .......................... 340/747

OTHER PUBLICATIONS

Procedural Elements for Computer Graphics, by David F. Rogers, 1985, Chapter Five "Rendering".

*Primary Examiner*—Phu K. Nguyen
*Assistant Examiner*—Cliff N. Vo
*Attorney, Agent, or Firm*—Price Gess & Ubell

[57] ABSTRACT

A transparency conversion circuit 40 is provided between a matrix conversion circuit 4 and an intensity calculation circuit 5 in a geometry processing unit 20. The transparency conversion circuit 40 is provided with a converter 41 and a parameter register 42. The converter 41 converts the transparency at the vertex that is input by the matrix conversion circuit 4 in correspondence to the Z component of the unit normal vector at the vertex, and the results are output to the intensity calculation circuit 5. The parameter register 42 holds a parameter value that is used for the conversion performed by the converter 41. As a result, the transparency at a polygon can be corrected while taking into consideration the angle formed by the planar surface of the polygon and the direction of the line-of-sight and the environment in which the polygon is placed. Therefore, a method for and an apparatus for transparency conversion whereby a translucent polygon is rendered to produce an impression of solidity are provided.

15 Claims, 7 Drawing Sheets

METHOD FOR AND APPARATUS FOR TRANSPARENCY CONVERSION, IMAGE PROCESSING SYSTEM

BACKGROUND OF THE INVENTION

1. Field of the Invention

The present invention relates to a method for and an apparatus for transparency conversion whereby the transparency at a polygon is changed based upon the Z components of the unit normal vectors at its vertices so that an impression of solidity can be rendered to a translucent polygon. In addition, the present invention relates to an image processing system equipped with the apparatus for transparency conversion.

2. Description of the Prior Art

In various types of game machines and image processing systems that utilize computer graphics, combinations of polygons are widely employed in order to display solid bodies placed within a virtual three dimensional space. The forms of expression of these polygons include transparent and translucent polygons as well as opaque polygons to express the various materials and the like of the solid bodies to be displayed. In addition, in order to render the texture of a solid body to be displayed, processes such as coloring the polygon, pasting a texture onto its surface and the like are performed. Moreover, when a plurality of polygons are placed on a display screen, they are structured in such a manner that their mutual positional relationships (foreground/background relationships) can be recognized. In other words, when polygons are positioned so that they overlay each other, such measures as hiding the polygon positioned behind and imposing perspective are taken to create the impression of depth perception and a sense of solid masses. It is to be noted that with a transparent polygon, when another object is positioned behind it, that object can be seen through the polygon in front without detracting from the color and the intensity of the object behind in any way whatsoever and that with a translucent polygon, objects behind can be seen through the polygon in front in a state in which the color and intensity of the object behind are varied in correspondence to the degree of transparency at the front polygon.

In order to perform the processing described above for each polygon, attributes such as vertex coordinates (X, Y, Z), vertex color (red, green, blue), texture coordinates (Tx, Ty), vertex transparency and normal vector at the vertex are provided for each vertex of the polygon. When expressing a solid body through this polygon, the attributes of each point (pixel) on ridge lines connecting the individual vertices are determined by complementing the attributes of each vertex and then attributes of all the pixels constituting the planar surface of the polygon are determined by complementing the attributes of the pixels on each ridge line.

For instance, when displaying a plurality of polygons, the decision making as to whether or not a specific polygon is positioned to the front of the screen with another polygon positioned behind it is performed by making a decision as to whether or not the two polygons are at positions that overlap through comparison of the X, Y coordinate values of the polygons to be compared and then by making a decision in regard to their foreground/background relationship through comparison of Z coordinate values of the individual pixels. While the direction of the normal vector of each pixel constituting a planar surface of a polygon determines the direction of the planar surface of the polygon (in which direction it is inclined), the normal vector of each pixel is determined through the complementary method by using the normal vectors of individual vertices. The normal vector of a vertex is found by taking the average of each normal vector of the polygons adjoining to the vertex. The expression of solid bodies with polygons can be equal to the approximate expression of the surface of solid bodies, which is formed by a series of curved surfaces, with polygons. Therefore, the normal vector of a vertex can be found as one point on the curved surface, that is, the vertical vector to the tangential plane at the vertex.

Furthermore, the color and the transparency at the planar surface of the polygon are determined through the complementary method based upon the color and the transparency at each vertex. As a result, a polygon in which the transparency and color change from one vertex to another can be expressed. In addition, in order to show patterns on the surface of a solid body, various patterns which are called textures are stored in memory in a texture map, which is prepared separately, and these textures are pasted onto the surface of the polygon in conformance to the texture coordinates.

Problems to be Solved by the Invention

Now, when an object constituted of a material with a specific degree of transparency is to be expressed with a plurality of polygons, since the transparency at the object is dependent upon the material that it is made of, a value indicating the transparency at the material is set at the vertices of each polygon. For instance, let us consider a case in which a translucent object, all portions of which are formed of the same material, is to be expressed with several polygons. Individual vertices a, b, c, of this object which is a dodecagonal angular tube M, as shown in the frontal view in FIG. 7 and the plan view in FIG. 8, are provided with data indicating their transparency in addition to their coordinate values and their normal vectors. In this case, assuming that the entire angular tube is formed of a single consistent material, the same value is given to each vertex to indicate its transparency.

However, in the prior art, when calculating the transparency at individual pixels based upon the transparency at these vertices, the transparency at the individual pixels is determined simply by complementing the transparency at the vertices without taking into consideration the angle of each polygon relative to the direction of the line-of-sight or the direction of the light source. As a result, when the angular tube M is viewed from the front, as shown in FIG. 7, even though the angle formed by the surface of the polygon and the direction of the line-of-sight varies among the individual polygons, all the polygons are expressed as images with the same degree of transparency. Consequently, when this angular tube M is positioned in front of another object (a triangular object, for instance) N, as shown in FIG. 9, an image with the object N positioned behind and appearing through to the same degree relative to all the surfaces of the angular tube M is displayed. Such display of an image is similar to that achieved by superimposing a flat, translucent object onto the object N and does not facilitate clear recognition of the object positioned in front of the object N as a solid angular tube.

In other words, if such an object is placed in the real world, the transparency at the object itself changes depending upon the light source and the direction of the line-of-sight, even though the transparency at the material that the object is made of does not change. As a result, in the real world, the degree to which an object that is positioned behind can be seen through an object in front differs between a polygon which faces front relative to the line-of-sight and a polygon that is positioned at an angle to the line-of-sight. However, since it is not possible to change the degree to which the object behind appears through an object in front in correspondence to the angle at which the polygon is positioned or the like in the prior art, the sense of solidity cannot be rendered to the object.

In addition, in the real world, the transparency at an object changes depending upon the environment in which the object is placed. For instance, the degree to which an object behind can be seen through an object formed of a specific material in daylight or under bright illumination differs from the degree to which the object placed behind the same object can be seen through the object in front at dusk or in other environments with only a little light. Because of this, even when a polygon is inclined at the same angle, the degree to which its transparency changes varies depending upon the environment in which the object is placed. Moreover, with colored objects, even when polygons are inclined at the same angle, the degree to which their transparency changes varies depending upon the color. However, since the transparency at individual pixels is calculated simply based upon the transparency provided for the vertices of each polygon in the prior art, without taking into consideration the degree to which the transparency changes depending upon the environment in which the object is placed, or depending upon the color of the object, it is not possible to display an image with a stereoscopic effect, which provides a heightened sense of reality.

A main object of the present invention, which has been proposed in order to solve the problems of the prior art described above, is to provide a method for and an apparatus for transparency conversion whereby, when expressing an object on a screen with polygons such as translucent polygons, an outstanding sense of visual realism can be rendered to the expressed object by correcting the transparency at the polygons in correspondence to the angle of inclination of their planar surfaces.

Another object of the present invention is to provide a method for and an apparatus for transparency conversion whereby, when changing transparency in correspondence to the angle of inclination of polygons, an object can be displayed with improved realism by either reducing or increasing the degree of relative change of transparency at the polygon in correspondence to the environment in which the object is placed or the color of the object.

Yet another object of the present invention is to provide an image processing system that achieves expression of an object with realism by incorporating the apparatus for transparency conversion described above.

SUMMARY OF THE INVENTION

In order to achieve the objects described above, the method for transparency conversion according to the present invention includes a step in which, for each vertex of a polygon placed within a virtual three dimensional space, coordinate data, a prescribed unit vector and a prescribed transparency within said three dimensional space are provided, a step in which said transparency at each of said vertices of said polygon is corrected based upon a Z component of said unit vectors of each of said vertices, and a step in which a transparency at each pixel enclosed by the vertices is determined by complementing said transparency thus corrected.

In addition, the present invention also relates to an apparatus for transparency conversion that embodies the invention of the method described above, which comprises a means for providing each vertex of a polygon within a three dimensional space with coordinate data, a prescribed unit vector and a prescribed transparency at each said vertex, a means for correcting said transparency at each of said vertices of said polygon based upon a Z component of said unit vectors of each of said vertices; and a means for determining a transparency at each pixel enclosed by the vertices by complementing said transparency thus corrected.

According to the invention described above, when calculating the transparency at each pixel based upon the transparency at the vertices of a polygon, the correction can be performed by taking into consideration the Z component of the unit vector at each vertex, i.e., the factor related to the angle at which and the direction in which the surface of the polygon is inclined. Consequently, it becomes possible to change the transparency depending upon the angle relative to the direction of the line-of-sight and the light source even for a solid body formed of a single material, achieving a sense of solidity that is close to reality when expressing an object with polygons.

Furthermore, in the image processing system according to the present invention, which comprises: a CPU that executes a program for displaying an image of an object placed within a virtual three dimensional space on a means for image display; a data buffer that stores data related to said object to be displayed as an image; a geometry processing unit connected to said data buffer that is provided with a data load circuit, a matrix conversion circuit, an intensity calculation circuit, a clipping circuit and a see-through conversion circuit to place said object within said three dimensional space in conformance to said data and convert said object into a two dimensional coordinate system on a display; a rendering processing unit that is provided with a paint-over circuit, a texture paste circuit, a depth test circuit and a blending circuit to perform processing such as coloring, shading and texture pasting on a surface of said object; a frame buffer connected to an output side of said blending circuit in said rendering processing unit; and a means for display that displays an image in conformance to image information output by said frame buffer wherein: an apparatus for transparency conversion provided with a means for providing each vertex of said polygon within said three dimensional space with coordinate data, a prescribed unit vector and a prescribed transparency at each said vertex, a means for correcting said transparency at each of said vertices of said polygon based upon a Z component of said unit vectors of each of said vertices; and a means for determining a transparency at each pixel enclosed by the vertices by complementing said transparency corrected thus is provided in said geometry processing unit.

According to the present invention structured as described above, through a simple structure in which an apparatus for transparency conversion is provided in the geometry processing unit, an image processing system that is capable of displaying more realistic looking images can be achieved without changing the structure of other portions.

Other and further objects, features and advantages of the invention will appear more fully from the following description.

DETAILED DESCRIPTION

An embodiment of the present invention is explained in a more specific manner in reference to FIGS. 1 through 6. In this embodiment, the apparatus for transparency conversion according to the present invention is incorporated in a portion of an image processing system that is employed to express a solid image on a display by using polygons.

(1) Overall structure of the image processing system

Figure 1:
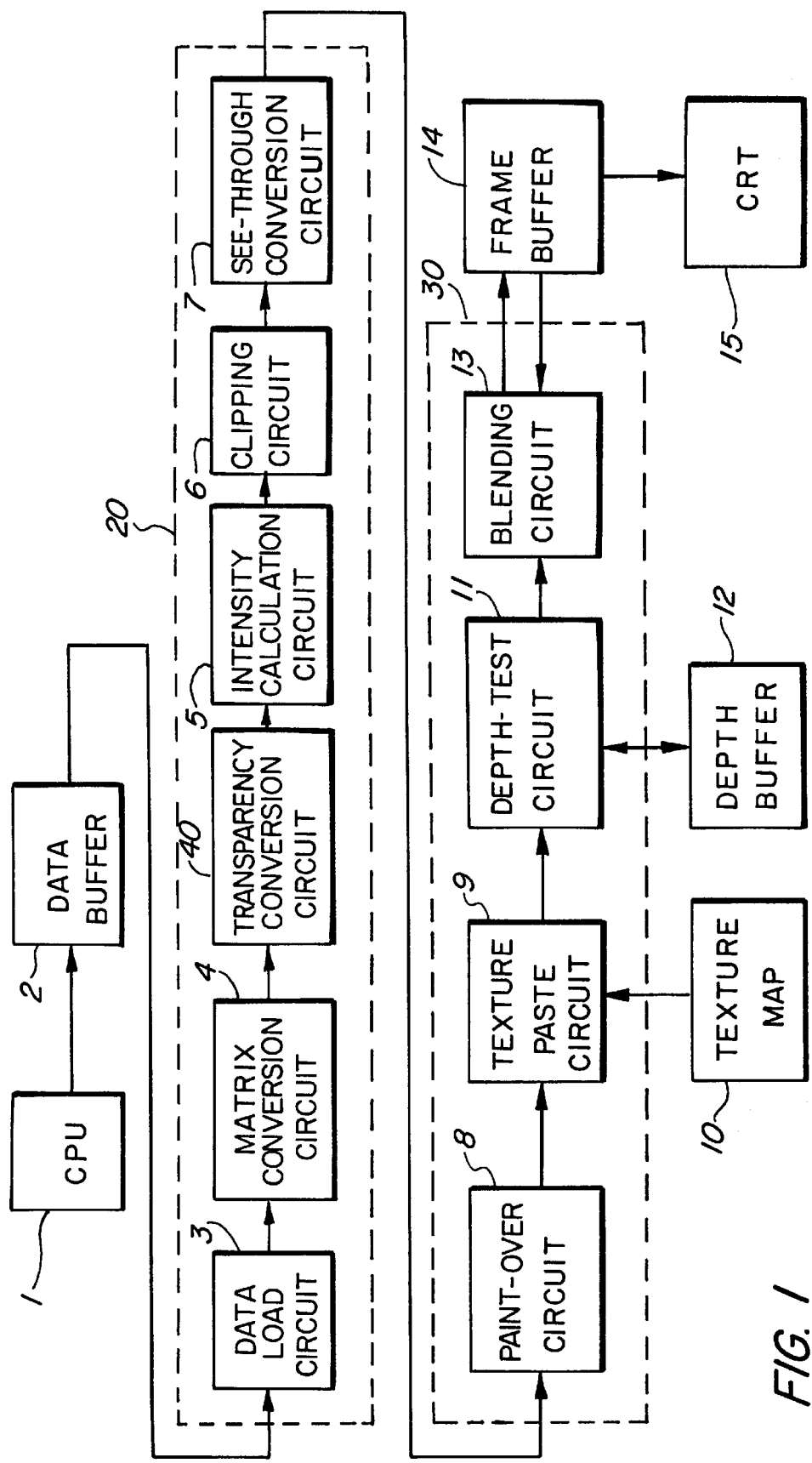
FIG. 1 is a block diagram showing the structure of an image processing system equipped with the apparatus for transparency conversion according to the present invention.

In FIG. 1, a CPU 1 controls the execution of a program for processing images that use polygons. To this CPU 1, a data buffer 2, which constitutes memory for temporarily storing data of vertices of polygons to be displayed on the display as the execution of the program progresses and also for temporarily storing register set functions is connected. A geometry processing unit 20 that positions polygons within a three dimensional space in conformance to the data to convert them to a two dimensional coordinate system on the display and a rendering processing unit 30 that performs processing such as coloring, shading and texture pasting for each polygon are connected to the data buffer 2. A frame buffer 14 is connected to the output side of the rendering processing unit 30 and a means for display such as a CRT 15 is connected to the frame buffer 14.

The geometry processing unit 20 comprises a data load circuit 3, a matrix conversion circuit 4, a transparency conversion circuit 40 which is constituted by adopting the apparatus according to the present invention in a circuit, an intensity calculation circuit 5, a clipping circuit 6 and a see-through conversion circuit 7. In this unit, the data load circuit 3 sequentially reads out the polygon vertex data (vertex coordinates, vertex color, texture coordinates, vertex transparency, vertex normal vector (unit normal vector) and the like) and the register set functions from the data buffer 2 in accordance with the progress of execution of the program in correspondence to the processing speed.* [2] The matrix conversion circuit 4 positions a polygon in a three dimensional space based upon the vertex coordinate data of the polygon and also performs view port setting in order to determine the range over which display is to be made within the three dimensional space. If the normal vectors are not provided, the matrix conversion circuit 4 calculates the inclination of the planar surfaces of the polygon within the three dimensional space and also calculates the normal vectors at the individual vertices based upon this. The intensity calculation circuit 5 calculates the intensity at each vertex based upon the normal vector at the vertex. The clipping circuit 6 eliminates the vertices that are located outside the view port so that the polygon can be placed in the view port and the see-through conversion circuit 7 performs conversion from a three dimensional to a two dimensional coordinate system.

The rendering processing unit 30 comprises a paint-over circuit 8, a texture paste circuit 9, a depth test circuit 11 and a blending circuit 13. The paint-over circuit 8 performs calculation on information on pixels that are located within the area enclosed by the individual vertices of a polygon and hands the result over to the other rendering processing modules. The texture paste circuit 9 reads out a texture corresponding to the individual pixels from the texture map 10 to calculate the color of the pixel.

The depth test circuit 11 compares the foreground/background relationships among a plurality of polygons and records the data on the polygon that is positioned frontmost in a depth buffer 12. In other words, the depth buffer 12, which stores the Z values of the pixels in other graphics (polygons) that have been drawn previously is connected to the depth test circuit 11. Then, when displaying a new polygon at the same position as a polygon has been drawn on the screen previously, the depth test circuit 11 compares the Z values of the individual pixels constituting the new polygon against the Z values of the pixels in the other polygon that has been drawn previously, which are called up from the depth buffer 12, and if the pixels belonging to the new polygon are positioned further toward the front, it writes their Z values in the depth buffer 12. The blending circuit 13 blends the color information on the pixels belonging to the previously drawn polygon that has been read from the frame buffer 14 and the color information on the pixels of the polygon that is to be newly processed and writes the resulting information in the frame buffer 14. The information in the frame buffer 14 is sent to the CRT 15 as information corresponding to one screen display at a time so that it can be displayed as an image.

(2) Structure of the transparency conversion circuit

Figure 2:
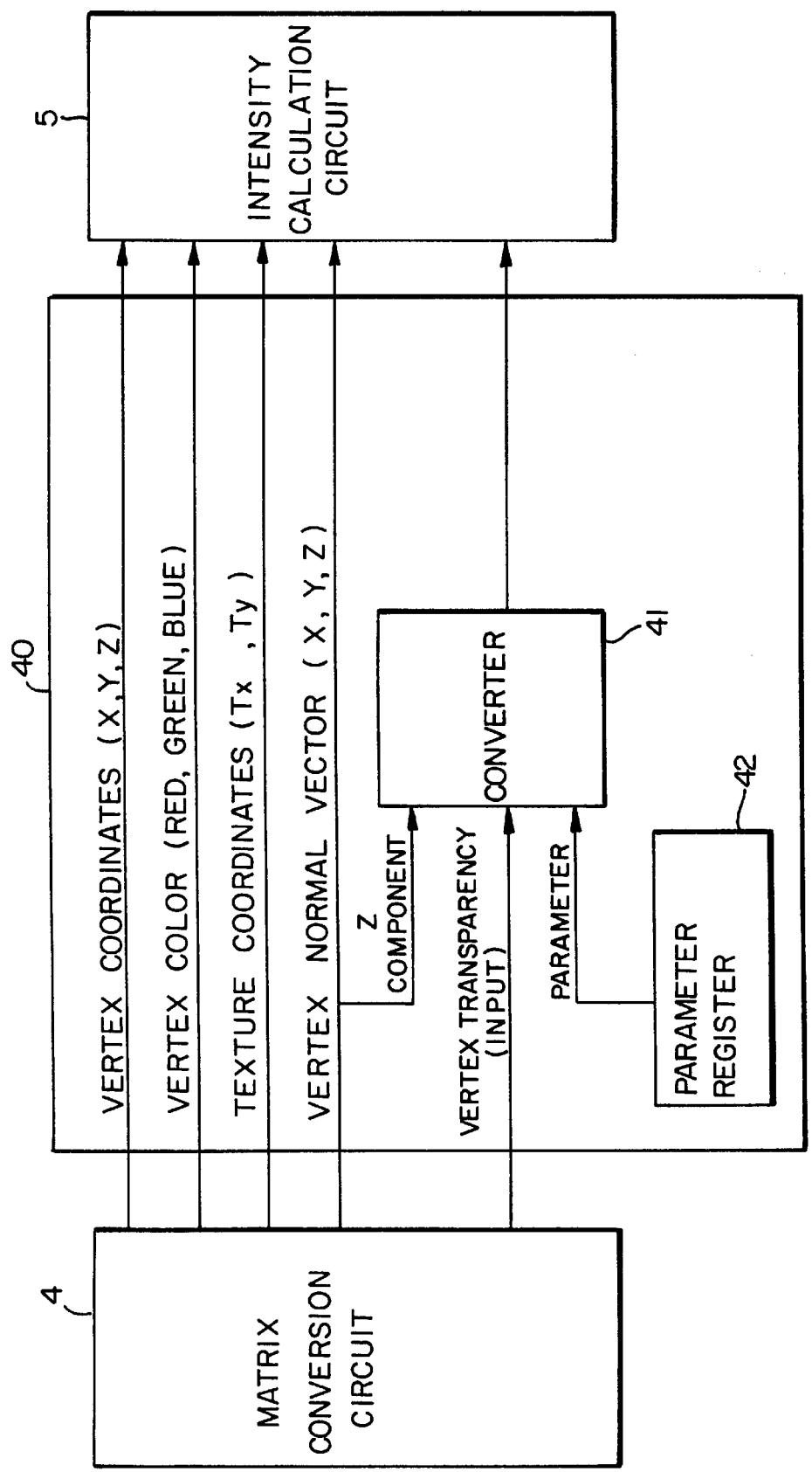
FIG. 2 is a block diagram showing an example of the apparatus for transparency conversion according to the present invention.

Next, the specific structure of the transparency conversion circuit 40 is explained. Namely, as shown in FIG. 2, the transparency conversion circuit 40 is provided between the matrix conversion circuit 4 and the intensity calculation circuit 5 and data such as the vertex coordinates (X, Y, Z), the vertex color (red, green, blue), the texture coordinates (Tx, Ty), the vertex transparency and the unit normal vector at the vertex after the matrix conversion are input to the transparency conversion circuit 40 from the matrix conversion circuit 4. It is to be noted that these data are provided to the matrix conversion circuit 4 from the data load circuit 3 in conformance to the execution of the program performed by the CPU as described earlier. In addition, in the matrix conversion circuit 4, if the unit normal vector at the vertex has not been input, the unit normal vector is calculated based upon the vertex coordinates, and if the unit normal vector at the vertex has been provided, matrix conversion is performed on the provided data of the unit normal vector and then are output.

The transparency conversion circuit 40 is provided with a converter 41 and a parameter register 42. The converter 41 converts the transparency at the vertex input from the matrix conversion circuit 4 in conformance to the transformation formula which is to be detailed later and outputs the results to the intensity calculation circuit 5. The parameter register 42 holds the parameter value that is to be used for the conversion of the transparency performed at the converter 41. This parameter value determines the correction factor of the transparency based upon the unit normal vector and is overwritten by the register set functions which are output from the data buffer 2 in conformance to the execution of the program.

This parameter value is set arbitrarily by the program which is executed by the CPU 1 and an appropriate value is set for the parameter value depending upon the strength of the environmental light within the space in which the polygon is placed, the angle formed by the environmental light and the polygon and the material and color of the object constituted by the polygon. It is to be noted that the parameter value does not necessarily have to be a fixed value and that it may change as the program executes. In addition, if the parameter value is determined in correspondence to the material or the like of the object that is constituted by the polygon, it may be set as a function of the color data of the attributes such as the vertex color provided for the polygon and the color data of the texture to be pasted on the polygon. In other words, this parameter may be changed at an appropriate rate in conformance to the change in the color data provided for the polygon and the texture.

The image processing system is constituted in such a manner that the vertex coordinates (X, Y, Z), the vertex color (red, green, blue), the texture coordinates (Tx, Ty) and the unit normal vector at each vertex are input unchanged from the transparency conversion circuit 40, and the converted vertex transparency that has been converted by the converter 41 is input to the intensity calculation circuit 5.

(3) Conversion of the vertex transparency at the converter

By using the parameter value P held at the parameter register 42 and the Z component Nz of the unit normal vector at each vertex, conversion of the vertex transparency is performed at the converter 41 in conformance to the following formula.
(Formula 1)

$$\alpha \text{ out} = \alpha \text{ in} \times (1-(1-Nz) \times P)$$

α out: transparency to be output
α in: transparency that has been input
Nz: Z component of the unit normal vector of the vertex ($0 \leq Nz \leq 1$)
P: parameter ($0 \leq P \leq 1$)

Figure 3:
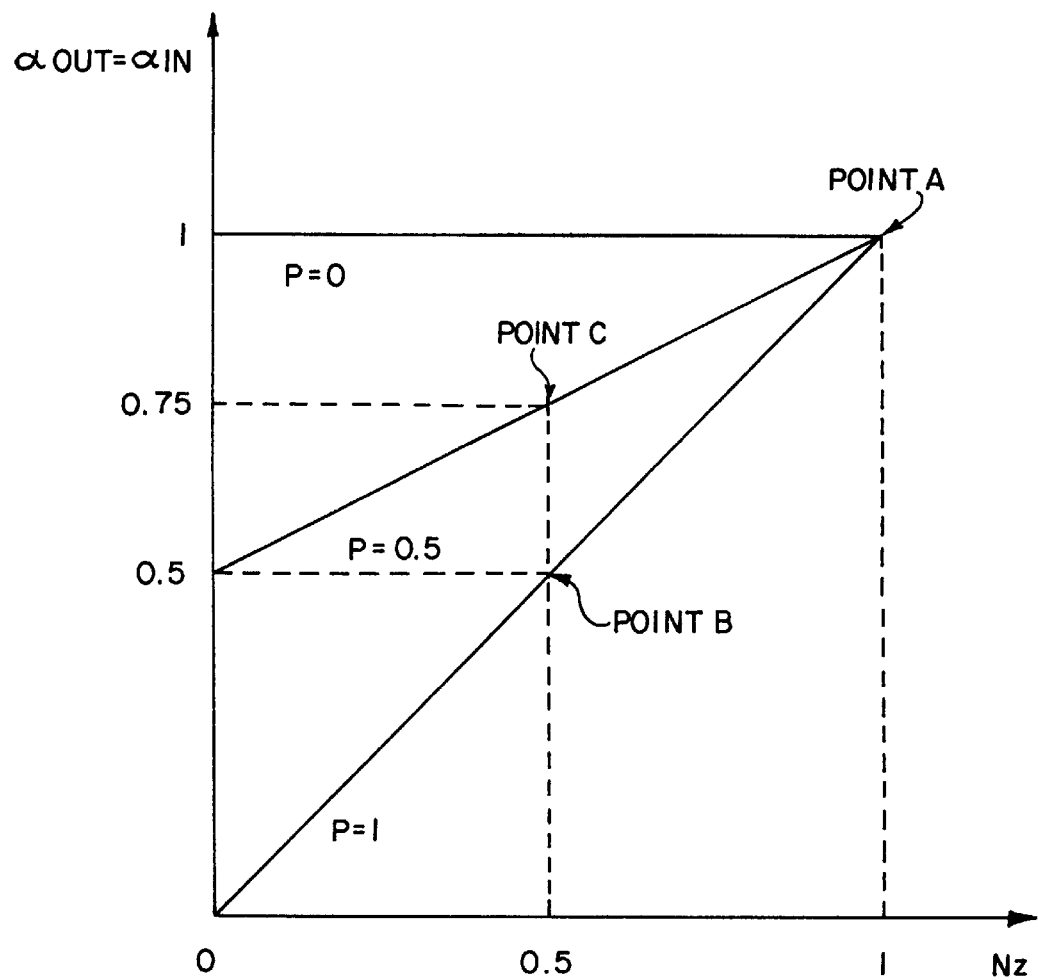
FIG. 3 is the relationships among the Z component of the unit normal vector, the parameter value P, the input transparency and the output transparency at each vertex.

Now, the relationships among the Z component of the unit normal vector at the vertex, the parameter value P, the input transparency and the output transparency are explained in reference to FIG. 3. In the graph shown in FIG. 3, the horizontal axis represents the Z component Nz of the unit normal vector and the vertical axis represents the rate of the output transparency α out against the input transparency α in. In addition, the straight unbroken lines in the graph indicate the relationship between the Z component of the unit normal vector and the ratio of the output transparency when varying parameter values are given (for instance, parameter value P=1, P=0.5 and P=0.

For instance, in FIG. 3, the closer the Z component Nz of the unit normal vector at the vertex is to 1 (when the direction of the unit normal vector extends at an angle of 0 relative to the direction of the line-of-sight and a planar surface of the polygon and the direction of the line-of-sight run at a right angle to each other), the closer the output transparency α out becomes to the input transparency α in. In contrast, as the Z component Nz approaches 0 (when the direction of the unit normal vector extends at an angle of 90° relative to the direction of the line-of-sight and the planar surface of the polygon and the direction of the line-of-sight run parallel to each other), the output transparency α out becomes lower than the input transparency α in by a larger degree.

Also, the parameter value P is set in such a manner that the closer the parameter value P is to 1, the higher the correction factor relative to the change in the angle of the polygon is and that the closer the parameter value P is to 0, the lower the correction factor becomes. For instance, when the Z component of the unit normal vector is at 1, i.e., when the angle formed by the polygon and the direction of the line-of-sight is a right angle as indicated with point A in FIG. 3, the correction factor does not change regardless of what the setting for the parameter value P is. When the Z component of the unit normal vector is 1, with the polygon and the direction of the line-of-sight running at a right angle to each other, there is no change whatsoever created by the parameter value P. However, when the angle formed by the polygon and the direction of the line-of-sight becomes reduced and the Z component of the unit normal vector approaches 0, the ratio of the output transparency α out against the input transparency α in becomes smaller with the parameter value P closer to 1 as indicated with point B and point C.

(4) Operation of the image processing system

Figure 4:
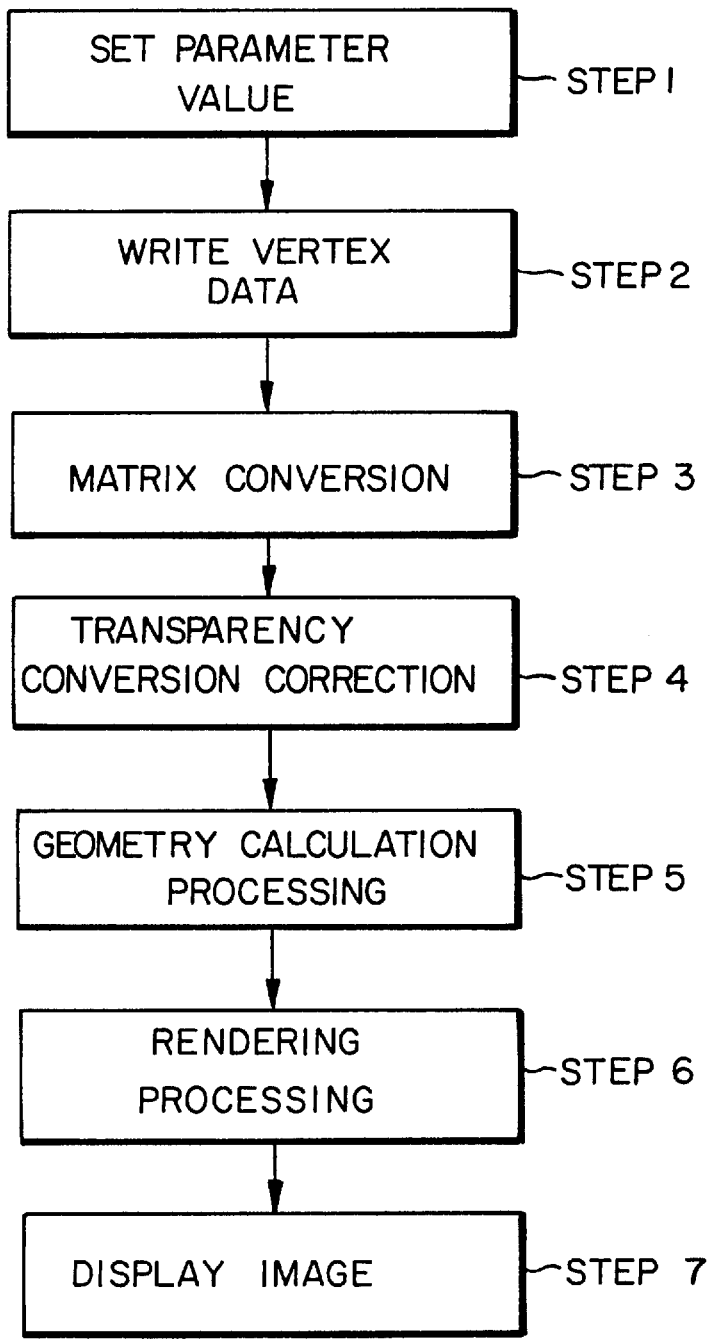
FIG. 4 is a flowchart illustrating the operation performed by the image processing system shown in FIG. 1.
Figure 5:
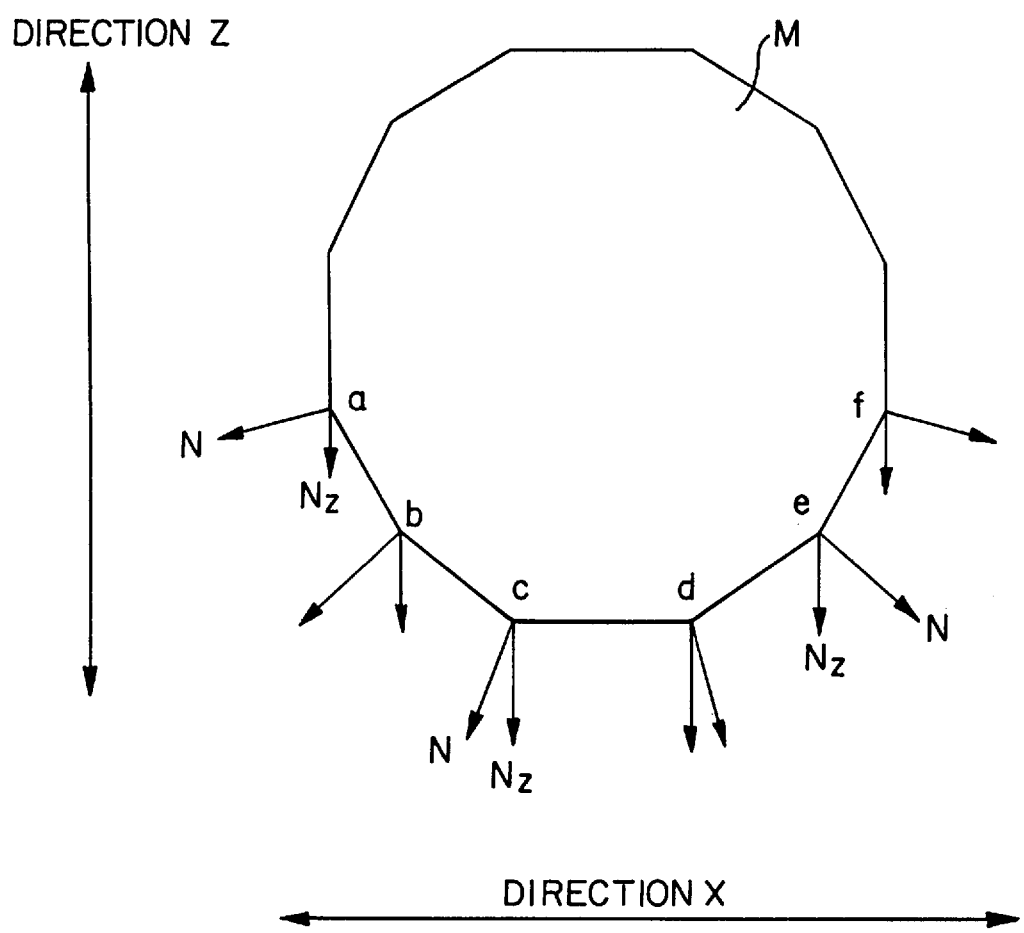
FIG. 5 is the Z component of the unit normal vector at each vertex of a polygon.
Figure 6:
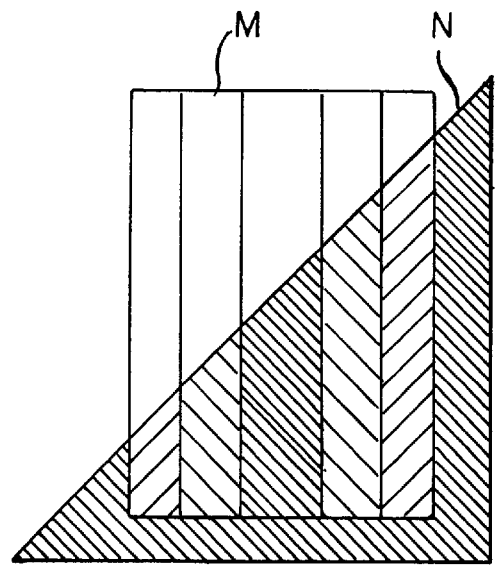
FIG. 6 is a side elevation showing the effect achieved by blending a translucent polygon upon which processing has been performed by the image processing system according to the present invention with another graphic.
Figure 7:
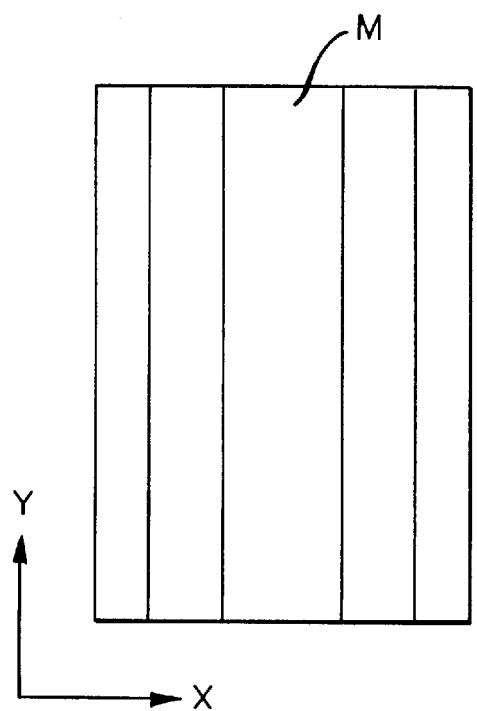
FIG. 7 is a side elevation of a angular tube shaped polygon.
Figure 8:
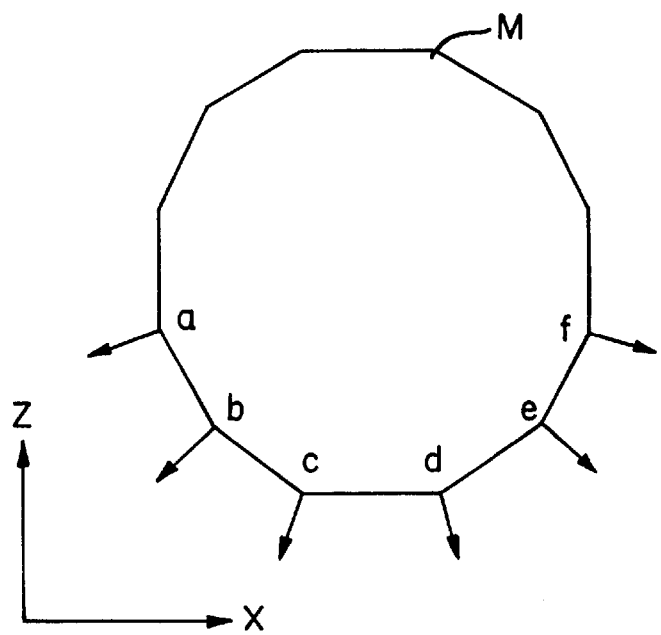
FIG. 8 is unit normal vectors at individual vertices of a polygon.
Figure 9:
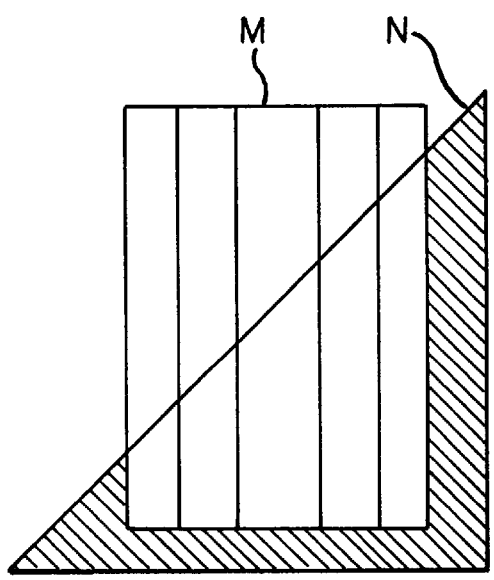
FIG. 9 is a side elevation showing the effect achieved by blending a translucent polygon upon which processing has been performed by an image processing system in the prior art with another graphic shape.

The operation of the image processing system in this embodiment structured as described above is explained in reference to the flowchart in FIG. 4. It is to be noted that in order to facilitate comparison with the prior art technology, the explanation is given of a case in which a translucent angular tube M as shown in FIGS. 5 and 6, is displayed to the front of a triangular shaped graphic N.

(Step 1) setting the parameter value

In conformance to the execution of the program, the CPU 1 writes the register set functions in the data buffer 2 and the register set functions written in the data buffer 2 are sequentially read out by the data load circuit 3 in accordance with the progress of execution of the program in correspondence to the processing speed of the program. Then, the parameter value is set in the parameter register 42 within the transparency conversion circuit 40 shown in FIG. 2. For instance, the strength and the direction of the environmental light within the three dimensional space in which the polygon is placed are determined in advance in the program and, consequently, parameter values corresponding to these values are set in the parameter register 42.

(Step 2) writing vertex data

The CPU 1 writes the attributes such as the vertex coordinates, the vertex color, the transparency, the texture coordinates, the normal vector and the like of each polygon constituting the angular tube M which is to be displayed on the means for image output such as a CRT, in the data buffer 2. It is to be noted that if the parameter value is determined by the attributes of the polygon to be drawn, the attributes of the polygon written in the data buffer 2 are read out through the data load circuit 3 and the parameter value that is calculated in conformance to these attributes is set in the parameter register 42 as in step 1.

(Step 3) matrix conversion

Each set of vertex data of a polygon read by the data load circuit 3 from the data buffer 2 is sent to the matrix conversion circuit 4, and at the matrix conversion circuit 4, matrix conversion is performed for the vertex coordinates and the results are output to the transparency conversion circuit 40. At this point, if the unit normal vectors of the vertices are not provided, the unit normal vectors are calculated based upon the vertex coordinates at the matrix conversion circuit 4 and the results are output to the transparency conversion circuit 40.

(Step 4) transparency conversion correction

The transparency at each vertex input to the transparency conversion circuit 40 is then corrected in the converter 41 based upon the Z component Nz of the unit normal vector at the vertex and the parameter value P set at the parameter register 42, and the corrected transparency is output to the intensity calculation circuit 5. In other words, as FIG. 5 indicates, even when the sizes of the normal vectors N at the individual vertices are equal to one another, their Z components vary depending upon the angle formed by the planar surface of the polygon and the direction of the line-of-sight, and the closer the angle formed by the planar surface of the polygon and the direction of the line-of-sight becomes to 90°, the larger the Z component of the unit normal vector becomes. As a result, at vertices c and d in the central portion of the angular tube, the Z components of the unit normal vectors are large (the Z components are close to 1) and, consequently, the corrected vertex transparency α out that is output from the transparency conversion circuit 40 is close to the input value α in that is input to the transparency conversion circuit 40. At the same time, toward the side surfaces of the angular tube, the Z component of the unit normal vector becomes smaller (the Z component approaches 0) and, as a result, the transparency α out at the vertex after the correction becomes lower than the input value α in that is input to the transparency conversion circuit 40.

(Step 5) geometry calculation processing

The data on the individual vertices of the polygon output from the matrix conversion circuit 4 and the transparency at each vertex that is corrected at the transparency conversion circuit 40 are then sent to the intensity calculation circuit 5, the clipping circuit 6 and the see-through conversion circuit 7 and, in the same manner as that employed in the prior art, geometry calculation processing is performed. Namely, the intensity at each vertex is calculated using the normal vector at the vertex at the intensity calculation circuit 5, the vertices that are located outside the view port are eliminated by the clipping circuit 6 and see-through conversion, whereby a polygon in a three dimensional space is placed within a two dimensional space seen through from a specific two dimensional coordinate system is performed at the see-through conversion circuit 7.

(Step 6) rendering processing

After the geometry processing is performed as described above, each set of vertex data on the polygon is output to the rendering processing unit 30. In the rendering processing unit 30, first, for each of the pixels enclosed by the individual vertices of polygon, data such as its coordinate values, texture coordinates, color, intensity and the like are calculated by complementing various types of data provided for each vertex at the paint-over circuit 8 and these pixel data are output to the texture paste circuit 9. The texture paste circuit 9, in turn, reads textures corresponding to the individual pixels from the texture map 10 to calculate the color for each pixel. The depth test circuit 11 takes out the Z coordinate value from among the coordinate values of each pixel and compares it to the Z coordinate value of another polygon that is stored in advance in the depth buffer 12. For instance, if a graphic constituted of a triangular polygon has been drawn previously, as shown in FIG. 6, since the Z coordinate value of each pixel of this graphic is already stored in the depth buffer 12, these Z coordinate values are compared to the Z coordinate values of the individual pixels of the polygon constituting the angular tube that is to be drawn, and the Z coordinate values of the polygon that is positioned further toward the front are written in the depth buffer 12.

At the blending circuit 13, the colors of the individual pixels of the triangular shaped graphic that are already written in the frame buffer 14 and the colors of the individual pixels of the angular tube polygon that is to be drawn are blended. The values resulting from this blending are written in the frame buffer 14. At this time, since the color of each pixel of the angular tube positioned further toward the front is multiplied with the transparency at each pixel, the ratio of the color data to be blended with the color data of the triangular shaped graphic that is positioned behind becomes reduced in a pixel with a higher degree of transparency. In other words, in this embodiment, the transparency at the vertices are corrected by the transparency conversion circuit 40 in such a manner that the further the angle at which the direction of the line-of-sight intersects with the planar surface of the polygon is from 90°, the lower the transparency becomes. Thus, even with a angular tube constituted of a single, consistent material, as shown in FIG. 5, since the transparency at the center of the angular tube is high, the color of the triangular shaped graphic positioned behind the angular tube is reflected to a higher degree, as shown in FIG. 6, whereas since the transparency at the side surfaces of the angular tube is low, the color of the angular tube largely remains, hiding the color of the triangular shaped graphic behind.

In FIG. 6, to explain briefly, the transparency of each pixel in one surface is expressed to be equal. However, as a matter of fact, the correction factor of the transparency of each pixel in one surface is equal. Essentially, the transparency of each pixel is complemented by the transparency of each vertex. Then ever in one surface, the transparency of each pixel may become different from each other.

For example, if one solid body expressed with polygons is formed of homogeneous material, the transparency of each vertex becomes equal, and then the transparency of each pixel may become equal in one surface. On the other hand, if the upper part of the object is completely transparent and the lower part of the object is opaque, the transparency of each vertex of one surface is different from each other. In this case, as the transparency of each pixel enclosed by those vertices is complemented by the transparency of the vertices, the various transparency can be provided to each pixel in one surface.

It is to be noted that if, judging from the Z coordinate values read from the depth buffer 12, an opaque polygon is positioned at the frontmost position, the color data of that polygon are written in the frame buffer 14 immediately, without performing blending at the blending circuit 13. In addition, if a completely transparent polygon is placed at the frontmost position, the frame buffer 14 holds the color data on the polygon behind it that are already written without changing them, without writing the color data of the frontmost polygon.

(Step 7) displaying image

The color data on the pixels that have been written in the frame buffer 14 in this manner are sent to the CRT 15 in units of individual display screens and the image is displayed.

(5) Effects of the embodiment

As has been explained so far, in this embodiment, since the transparency at each vertex can be changed in correspondence to the shape of a translucent polygon and the angle that it forms relative to the direction of the line-of-sight, it is possible to give a feeling of solidity to the polygon. In addition, by setting the parameter value P in correspondence to the environment in which the polygon is placed and the characteristics of the object that is constituted by the polygon, elements other than the angle formed by the polygon and the direction of the line-of-sight can be used as conversion factors, achieving transparency conversion with an even higher degree of accuracy.

(6) Another embodiment

The present invention is not limited to the embodiment described above and the conversion performed at the transparency conversion circuit 40 may be performed depending only upon the Z component of the unit normal vector at each vertex without using the parameter value P. In that case, the conversion of the vertex transparency at the converter 41 is performed based upon the following formula.
(Formula 2)

$$\alpha \text{ out} = \alpha \text{ in} \times Nz$$

In addition, while in the embodiment described above, the Z component of the unit normal vector is utilized when calculating the transparency after the correction, it is possible to input the value of the Z component of the normal vector directly to the converter unchanged, depending upon how the arithmetic expression is set up. Moreover, since the unit normal vector and the normal vector for each vertex can be easily calculated using the three dimensional coordinate values of each vertex in the polygon, it goes without saying that the normal vector data to be provided for each vertex as described in the claims in the present invention may include data that are obtained through arithmetic calculation.

Effects of the Invention

As has been explained, according to the present invention, a method for and an apparatus for transparency conversion whereby an outstanding impression of solidity and realism is rendered to an object that is expressed with translucent polygons by changing the transparency at the polygons based upon the Z component of the unit normal vector of each vertex can be provided. Thus, the method for and the apparatus for transparency conversion according to the present invention may be adopted in game machines and simulation devices that employ computer generated images, to provide images with a higher degree of accuracy and with better sense of solidity and realism than those achieved in the prior art. In addition, by increasing and reducing the degree to which the transparency changes at the polygons in correspondence to the environment in which the object is placed and the color of the object, it becomes possible to display the object with better realism.

In particular, according to the present invention, transparency conversion is performed on the transparency provided for each vertex of a polygon, and processing such as geometry and rendering can be implemented in exactly the same manner as that employed in the prior art. Therefore, through simple modification on an image processing system in the known art, outstanding image expression is achieved.

What is claimed is:

1. A method for transparency conversion including:

a step in which, for each vertex of a polygon placed within a virtual three dimensional space, coordinate data, unit vector and a transparency, at each of said vertices of said polygon, within said three dimensional space are provided;

a step in which said transparency at each of said vertices of said polygon is corrected based upon a Z component of said unit vectors of each of said vertices; and a step in which a transparency at each pixel enclosed by the vertices is determined by complementing said transparency thus corrected.

2. A method for transparency conversion according to claim 1, wherein:

said step in which said transparency at each of said vertices of said polygon is corrected based upon said Z component of said unit vectors of each of said vertices includes a step in which a parameter that is to be referenced when correcting said transparency is obtained and a step in which a ratio at which said Z component of said unit vectors is incorporated in conformance to said parameter is determined.

3. A method for transparency conversion according to claim 2, wherein:

said step in which said transparency is converted is executed based upon the formula below;
(Formula 3)

$$\alpha \text{ out} = \alpha \text{ in} \times (1-(1-Nz) \times P),$$

with $\alpha$ in being transparency at each said vertex of said polygon, $\alpha$ out being corrected transparency at each said vertex, Nz being a Z component of said unit normal vector at each said vertex, and P being a parameter value.

4. A method for transparency conversion according to claim 1, wherein said unit vector is a unit normal vector.

5. An apparatus for transparency conversion comprising:

a means for providing each vertex of a polygon within a three dimensional space with coordinate data, a prescribed unit vector and a prescribed transparency at each said vertex, a means for correcting said transparency at each of said vertices of said polygon based upon a Z component of said unit vectors of each of said vertices; and a means for determining a transparency at each pixel enclosed by the vertices by complementing said transparency thus corrected.

6. An apparatus for transparency conversion according to claim 5, wherein:

said means for correcting transparency at each said vertex of said polygon based upon said Z component of said unit vector of each vertex includes a register that holds a parameter that is to be referenced when correcting said transparency and a converter that corrects said transparency at each said vertex in conformance to said parameter and said Z component of said unit normal vector.

7. An apparatus for transparency conversion according to claim 6, wherein:

said converter calculates transparency at each said vertex after correction by using the formula below;
(Formula 4)

$$\alpha \text{ out} = \alpha \text{ in} \times (1-(1-Nz) \times P),$$

with $\alpha$ in being transparency at each vertex of a polygon, $\alpha$ out being a corrected transparency at each said vertex, Nz being said Z component of said unit normal vector of each vertex and P being said parameter value.

8. An image processing system comprising:

a CPU that executes a program for displaying an image of an object placed within a virtual three dimensional space on a means for image display;

a data buffer that stores data related to said object to be displayed as an image;

a geometry processing unit connected to said data buffer that is provided with a data load circuit, a matrix conversion circuit, an intensity calculation circuit, a clipping circuit and a see-through conversion circuit to place said object within said three dimensional space in conformance to said data and convert said object into a two dimensional coordinate system on a display;

a rendering processing unit that is provided with a paint-over circuit, a texture paste circuit, a depth test circuit and a blending circuit to perform processing such as coloring, shading and texture pasting on a surface of said object;

a frame buffer connected to an output side of said blending circuit in said rendering processing unit; and a means for display that displays an image in conformance to image information output by said frame buffer wherein:

an apparatus for transparency conversion provided with a means for providing each vertex of said polygon within said three dimensional space with coordinate data, a prescribed unit vector and a prescribed transparency at each said vertex, a means for correcting said transparency at each of said vertices of said polygon based upon a Z component of said unit vectors of each of said vertices; and a means for determining a transparency at each pixel enclosed by the vertices by complementing said transparency corrected thus is provided in said geometry processing unit.

9. A machine-readable storage medium containing a program for executing a method for transparency conversion, said program including:

a step in which, for each vertex of a polygon placed within a virtual three dimensional space, coordinate data, a prescribed unit vector and a prescribed transparency, at each of said vertices of said polygon, within said three dimensional space are provided;

a step in which said transparency at each of said vertices of said polygon is corrected based upon a Z component of said unit vectors of each of said vertices; and a step in which a transparency at each pixel enclosed by the vertices is determined by complementing said transparency thus corrected.

10. A method for transparency conversion comprising:

a step for calculating a normal vector of a polygon placed in a virtual space on the basis of drawing data for drawing said polygon in said virtual three dimensional space which includes a transparency value; and a step for correcting said transparency in said drawing data on the basis of a Z component of said normal vector.

11. A method for image display comprising:

a step for determining an overlap of a first polygon and a second polygon on the basis of drawing data for displaying a polygon on a screen of a display device and further calculating a normal vector of said second polygon in a virtual three dimensional space;

a step for calculating the transparency of said second polygon on the basis of said calculated normal vector;

a step for generating image data of said overlapping portion of the first polygon and the second polygon on the basis of said calculated transparency; and a step for displaying images on said screen in accordance with said image data.

12. A method for image display according to claim 11, wherein said drawing data include coordinate data and transparency values of vertexes of a polygon, and said step for transparency calculation further comprises:

a step for calculating transparency for said vertexes based upon the Z component of said normal vector; and a step for calculating a transparency of a portion enclosed by the coordinate data of said vertexes on the basis of said calculated transparency of the vertexes.

13. A method for image display according to claim 12, wherein said step for generating image data generates image data on the basis of said drawing data of the first polygon data, said drawing data of the second polygon, and said calculated transparency.

14. A method for image display according to claim 13, wherein said step for generating image data generates said image data by blending a first color data obtained on the basis of said calculated transparency of the first polygon and a second color data obtained on the basis of said drawing data of the second polygon determined in accordance with said calculated transparency.

15. A method for image display according to claim 11, wherein said step for calculating transparency refers to a specified parameter when calculating a transparency on the basis of said normal vector.

* * * * *